United States Patent Office 2,802,008
Patented Aug. 6, 1957

2,802,008
HALOGENATED AND ALKOXYLATED 1-PHENYL-1-PYRIDYL DERIVATIVES OF UREA AND 3-ALKYLUREA

Robert R. Burtner, Skokie, Ill., assignor, by mesne assignments, to G. D. Searle & Co., Skokie, Ill., a corporation of Delaware No Drawing. Application November 30, 1953,
Serial No. 395,253

12 Claims. (Cl. 260—295)

This invention relates to halogenated and alkoxylated 1-phenyl-1-pyridyl derivatives of urea and 3-alkylurea, to acid addition and quaternary ammonium salts thereof, and to processes for the preparation of these derivatives and their salts. More particularly, this invention relates to compounds of the formula

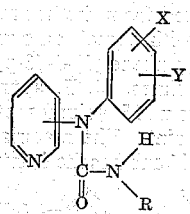

wherein X represents hydrogen or halogen and Y represents hydrogen or a lower alkoxy radical, X and Y being non-identical; and R represents hydrogen or a lower alkyl radical.

In the foregoing structural formula, the point of attachment of the pyridyl group may be ortho, meta, or para to the ring nitrogen. The lower alkoxyl and alkyl radicals comprehended by Y and R, respectively, as hereinabove defined, include those radicals in these two categories which contain not more than 4 carbon atoms, namely, in the first category, methoxyl, ethoxyl, n- propoxyl, isopropoxyl, n-butoxyl, isobutoxyl, sec-butoxyl, and tert-butoxyl radicals and, in the second category, the corresponding methyl, ethyl, n-propyl, isopropyl, n-butyl, isobutyl, sec-butyl and tert-butyl radicals.

Equivalent to the (basic) compounds of the above formula for the purposes of this invention are (1) the acid addition salts formed by interaction of the subject compounds with one equivalent of any of various inorganic and strong organic acids, and (2) the quaternary ammonium salts prepared from compounds of the aforesaid formula by reaction thereof with a lower alkyl ester or halide. These acid addition and quaternary ammonium salts may be represented by the formula

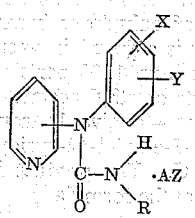

wherein X, Y, and R having the meanings hereinbefore assigned, A is hydrogen or a lower alkyl group containing not more than 4 carbon atoms, and Z is one equivalent of a non-toxic anion—for example, chloride, bromide, iodide, methyl sulfate, ethyl sulfate, benzenesulfonate, toluenesulfonate, tartrate, succinate, malate, acetate, citrate, nitrate, sulfate, phosphate, sulfamate or the like.

The compounds of this invention are valuable in medicine as cardio-regulatory agents. Their capacity for exercising a depressor effect on the heart muscle commends their use in the treatment of auricular fibrillation and flutter, paroxysmal tachycardia, and divers other cardiac dysfunctions associated with rhythm changes of the heart caused by disturbances in the regular automaticity or conductance pattern of its beat. Additionally, the subject compounds are useful as diuretics. As such, they have the property of augmenting both urine volume and sodium excretion, producing a significant loss of body weight and decreased dyspnea in those cases of edema which frequently accompany congestive cardiac failure, renal disease, cirrhosis of the liver, and other common pathologic states.

The amine bases which comprise this invention are relatively insoluble in water, but may be dissolved in dilute acids and in most of the common organic solvents. The acid addition and quaternary ammonium salts of this invention are, on the other hand, readily soluble in water and in aqueous solutions of alcohols or other water-miscible organic solvents. The subject compounds may be administered in solid form as tablets or capsules; dissolved or suspended in aqueous media, they may be given parenterally.

The 1-(2- and 4-pyridyl)-urea derivatives to which this invention relates are conveniently prepared according to the following procedure: A 2- or 4-halogenated pyridine, for example 2-bromopyridine, is reacted with an appropriately substituted aniline, for example 5-chloro-2-methoxyaniline, in the presence of a condensing agent such as potassium carbonate or—preferably—copper powder to form a 2- or 4-anilinopyridine. The condensation is ordinarily carried out at elevated temperatures (120 to 175° centigrade) and reduced pressures (25 to 60 millimeters of mercury) over periods of time ranging upward from one hour. One suitable combination of temperature, pressure, and time is 140–150° centigrade at 40 millimeters' absolute pressure for 15 hours. The anilinopyridine thus obtained is converted to the corresponding non-alkylated urea derivative of this invention by reaction with phosgene in the presence of an alkaline condensing agent such as tri-n-butylamine at lowered temperatures (of the order of −5 to 0° centigrade) for periods of time in the neighborhood of 2–5 hours, using chloroform— or other halogenated hydrocarbon or the equivalent thereof—as a solvent, followed by dissolution of the chloro compound so obtained in an inert, anhydrous, organic medium—for example benzene—and subsequent saturation with ammonia gas. Alternatively, the 2- and 4-anilinopyridine derivatives obtained above can be reacted with a lower alkyl isocyanate—for example ethyl isocyanate—using an inert, non-polar, organic solvent such as benzene at reflux temperatures for upward of 6 hours to produce the corresponding 3-alkylurea derivatives of this invention.

The 1-(3-pyridyl)-urea derivatives to which this invention pertains are prepared from the corresponding 3-anilinopyridines by procedures identical with those used (and outlined above) for synthesis of the subject 1-(2- and 4-pyridyl)-ureas. The 3-anilinopyridine intermediates, however, are obtained as follows: an appropriately substituted aniline, for example p-phenetidine, is reacted with sodamide at reflux temperatures in an inert atmosphere until evolution of ammonia gas effectively ceases. The sodio derivative thus formed is, in turn, reacted with a 3-halogenated pyridine—preferably 3-bromopyridine— at reflux temperatures for periods of time ranging upward from 6 hours to give the desired 3-anilinopyridine derivative.

The following examples will illustrate in detail certain of the urea derivatives which constitute the present invention and methods which have been devised for their preparation. However, the invention is not to be construed as limited thereby, either in spirit or in scope, since it will be apparent to those skilled in the art of organic synthesis that many modifications, both of ma-

Example 1

A. *2-(p-phenetidino)-pyridine.*—A mixture of 158 parts of 2-bromopyridine, 137 parts of p-phenetidine, and 6 parts of copper powder is heated at 140–150° C. (jacket temperature) under an absolute pressure of 40 mm. of mercury for 6 hours, at the end of which time sufficient hot 10% aqueous muriatic acid is introduced to render the reaction mixture acid, whereupon the copper catalyst is filtered out. The filtrate is made alkaline with 25% aqueous caustic soda; and the base, which is precipitated as an oil, is then extracted into ether. Stripping of the solvent, followed by vacuum distillation, yields the desired 2-(p-phenetidino)-pyridine as a white solid, M. P. approximately 92° C.

B. *p-Phenetyl-2-pyridylcarbamyl chloride.*—A solution of 168 parts of the phenetidinopyridine of the foregoing Part A and 145 parts of tri-n-butylamine in 750 parts of chloroform is slowly added at —5 to 0° C. to a stirred solution of 78 parts of phosgene in 500 parts of chloroform. Upon completion of the addition, the reagents are stirred for 5 hours at 0° and then allowed to warm to room temperature overnight. The solvent is stripped in vacuo and the viscous residue thereupon dissolved in 1400 parts of alcohol-free ether. This solution is washed quickly with ice water and immediately thereafter dried over anhydrous sodium sulfate. The solvent is distilled off, following which the viscous residue is heated in vacuo to approximately 55° C. to remove the last traces of volatile impurities. The desired product thus obtained as a viscous, yellow oil crystallizes on standing to form a white solid, M. P. 71–72° C.

C. *1-(p-phenetyl)-1-(2-pyridyl)-urea.*—A solution of 55 parts of the acid chloride of the foregoing Part B in approximately 700 parts of benzene is saturated with ammonia gas at room temperature. The yellow solid so produced is recovered on a filter, washed thereon with benzene, triturated with water, and dried, in that order. Crystallization from a large volume of isopropyl alcohol gives thick colorless needles of 1-(p-phenetyl)-1-(2-pyridyl)-urea, M. P. 155–156° C. The product is soluble in dilute muriatic acid and has the formula

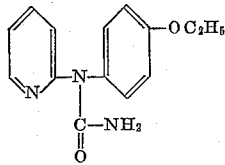

Example 2

*3-ethyl-1-(p-phenetyl)-1-(2-pyridyl)-urea.*—A solution of 214 parts of the 2-(p-phenetidino)-pyridine of Example 1A and 71 parts of ethyl isocyanate in 175 parts of anhydrous benzene is heated at reflux temperatures for 12 hours. Solvent is stripped in vacuo, and the solid residue is then crystallized from 4 volumes of ethyl acetate, using decolorizing charcoal in process, to give white crystals of 3-ethyl-1-(p-phenetyl)-1-)2-pyridyl)-urea, M. P. approximately 130° C. The product, soluble in dilute muriatic acid, has the formula

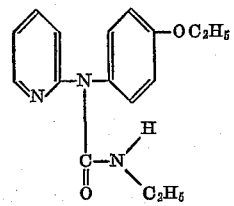

Example 3

A. *3-(p-phenetidino)-pyridine.*—A stirred mixture of 274 parts of p-phenetidine and 78 parts of sodamide in approximately 2600 parts of toluene is refluxed in an atmosphere of nitrogen until evolution of ammonia gas ceases. Heating is discontinued while 316 parts of 3-bromopyridine is added, following which the reaction mixture is again stirred and refluxed for 12 hours. Evaporation of the toluene layer, followed by vacuum distillation of the residue, gives an oil—B. P. 155–165° C. at 0.25 mm. pressure—which crystallizes on standing. The crystalline material, recrystallized from a mixture of benzene and cyclohexane, shows M. P. 110° C. The desired product is thus obtained in the form of white rosettes.

B. *3-ethyl-1-(p-phenetyl)-1-(3-pyridyl)-urea.*—A solution of 130 parts of the phenetidinopyridine of the foregoing Part A and approximately 50 parts of ethyl isocyanate in approximately 1300 parts of anhydrous benzene is refluxed for 12 hours. The crystalline product thus formed is filtered from the hot reaction mixture and rinsed on the filter with a small amount of benzene. The product, 3-ethyl-1-(p-phenetyl)-1-(3-pyridyl)-urea, is obtained as lustrous plates, M. P. approximately 210° C. Recrystallization from 15 volumes of alcohol does not alter this melting point. The material is readily soluble in dilute muriatic acid and has the formula

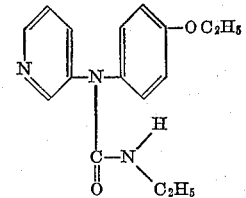

Example 4

A. *2-(p-chloroanilino)-pyridine.*—A mixture of 255 parts of p-chloroaniline, 316 parts of 2-bromopyridine, and 5 parts of copper powder is heated at 140–150° C. (jacket temperature) under an absolute pressure of 40 mm. of mercury for 6 hours. The product is dissolved in approximately 6000 parts of 2% aqueous muriatic acid at 80° C. Catalyst is filtered out and the filtrate then made alkaline with excess caustic soda, thus precipitating the desired anilinopyridine as a granular solid. The product is purified by distillation, yielding a pale, yellow oil—B. P. 130–135° C. at 0.15 mm. pressure—which solidifies on cooling to form pale, yellow crystals, M. P. approximately 116° C.

B. *1-(p-chlorophenyl)-3-ethyl-1-(2-pyridyl)-urea.* — A solution of 102 parts of the anilinopyridine of the foregoing Part A and 37 parts of ethyl isocyanate in approximately 660 parts of anhydrous benzene is refluxed for 12 hours. Solvent is stripped in vacuo; and the residue is crystallized, first from 1200 parts of cyclohexane, and then from 540 parts of ethyl acetate—using decolorizing charcoal in process—to give lustrous, white plates of 1-(p-chlorophenyl)-3-ethyl-1-(2-pyridyl)-urea, M. P. approximately 136° C. The product is soluble in dilute muriatic acid. It has the formula

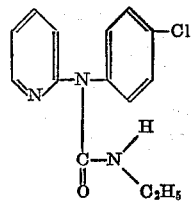

Example 5

A. *2-(5-chloro-2-methoxyanilino)-pyridine.* — A mixture of 473 parts of 5-chloro-2-methoxyaniline, 474 parts of 2-bromopyridine, and 5 parts of copper powder is heated at 140–150° C. (jacket temperature) under an absolute pressure of 40 mm. of mercury for 15 hours. At the end of this time, sufficient hot 2% aqueous muriatic acid is introduced to render the reaction mixture acid, whereupon the copper catalyst is filtered out. The filtrate is made alkaline with excess aqueous caustic soda; and the base, which is precipitated as an oil, is then extracted into ether. The ether solution is washed with water, dried over sodium sulfate, and stripped of solvent, in that order. The residue, upon distillation, affords a pale, yellow oil, B. P. 150–153° C. at 0.3 mm. pressure.

B. *1-(5-chloro-2-methoxyphenyl)-3-ethyl-1-(2-pyridyl)-urea.*—A solution of 46 parts of the anilinopyridine of the foregoing Part A and 14 parts of ethyl isocyanate in 260 parts of anhydrous benzene is refluxed for 12 hours. Solvent is stripped in vacuo and the residue thereupon crystallized twice from cyclohexane, producing white needles, M. P. 93–94° C. The 1-(5-chloro-2-methoxyphenyl)-3-ethyl-1-(2-pyridyl)-urea thus obtained is soluble in dilute muriatic acid and has the formula

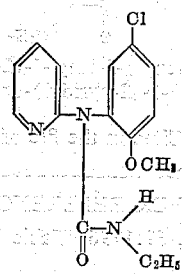

*Example 6*

*1-(p-phenetyl)-1-(2-pyridyl)-urea-3-acetic acid.*—A solution of 15 parts of glycine in 400 parts of 0.4% aqueous caustic soda is added to a solution of 50 parts of the p-phenetyl-2-pyridylcarbamyl chloride of Example 1B in 235 parts of anhydrous acetone. Sufficient additional acetone (approximately 160 parts) is introduced to produce a clear solution, which is then stored at room temperature for 24 hours. Acetone and about half of the water present are then stripped in vacuo, following which 500 parts of 1% aqueous caustic soda is added to the residue. The solution thus obtained is washed with ether as a means of removing traces of oily impurity, then aerated to eliminate residual ether, and finally acidified to a point of maximum precipitation (i. e., the material is made acid to litmus but alkaline to Congo red). The desired urea derivative thus obtained granulates on standing to a cream colored solid which, filtered off, triturated with water, and dried, in that order, and then crystallized from 5 volumes of alcohol—using decolorizing charcoal in process—gives white crystals of 1-(p-phenetyl)-1-(2-pyridyl)-urea-3-acetic acid, M. P. approximately 161° C. The product is soluble in dilute aqueous muriatic acid and in dilute alkali. It has the formula

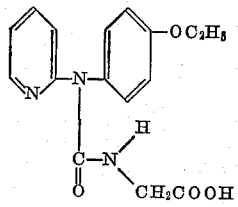

*Example 7*

*3-(β-diethylaminoethyl)-1-(p-phenetyl)-1-(2-pyridyl)-urea hydrochloride.*—A solution of 55 parts of the p-phenetyl-2-pyridylcarbamyl chloride of Example 1B and 58 parts of β-diethylaminoethylamine in approximately 450 parts of benzene is refluxed for 1½ hours. The reaction mixture is cooled and then agitated with 400 parts of 10% aqueous caustic soda, following which the benzene layer is separated and the aqueous phase then extracted once with ether. The ether extract is combined with the benzene solution isolated above, and the material thus obtained is washed well with water, dried over anhydrous sodium sulfate and stripped of solvent, in that order. Traces of volatile material remaining in the residue are removed by heating in vacuo at temperatures in the neighborhood of 90° C. The oily base thus obtained is taken up in approximately 2100 parts of anhydrous ether and then treated with one equivalent of absolute alcoholic hydrogen chloride solution. The crystalline hydrochloride so precipitated is collected on a filter, rinsed thereon with ether, and finally crystallized from approximately 575 parts of methyl ethyl ketone, using decolorizing charcoal in process. The white crystalline product, 3-(β-diethylaminoethyl)-1-(p-phenetyl)-1-(2-pyridyl)-urea hydrochloride, shows M. P. 155–156° C. It is soluble in water and has the formula

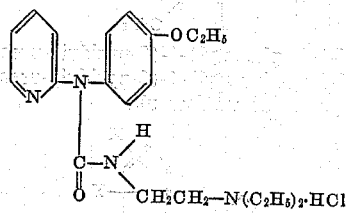

*Example 8*

*Bis[3-methylene-1-(p-phenetyl)-1-(2-pyridyl)-urea].*—A mixture of 276 parts of the p-phenetyl-2-pyridylcarbamyl chloride of Example 1B and 120 parts of ethylenediamine in 1760 parts of benzene is refluxed for 2½ hours. The reaction mixture is cooled and then agitated with 200 parts of 5% aqueous caustic soda. The benzene layer is separated, washed with water, and stripped of solvent, in that order. The residue, a tacky, yellow solid, is taken up in 2% aqueous muriatic acid and the resultant solution then treated with decolorizing charcoal. Charcoal is filtered out and the filtrate thereupon made alkaline with an excess of 10% aqueous caustic soda. The yellow oily base so precipitated granulates on standing. Two crystallizations from methyl alcohol gives bis[3-methylene-1-(p-phenetyl)-1-(2-pyridyl)-urea] as white needles, M. P. 139–140° C. The product, soluble in dilute muriatic acid, has the formula

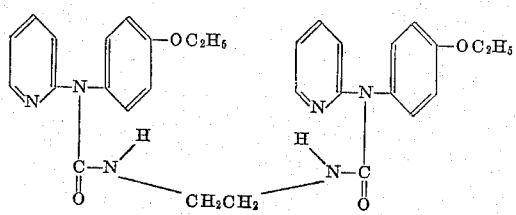

I claim:
1. A compound of the formula

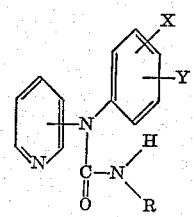

wherein X is selected from the group consisting of hydrogen, bromine, and chlorine, and Y is selected from the group consisting of hydrogen and lower alkoxy radicals, said selections being such that X and Y do not simultaneously represent hydrogen; and R is selected from the group consisting of hydrogen and lower alkyl radicals, 2. A compound of the formula

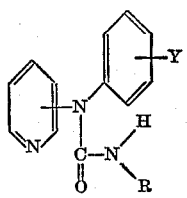

wherein Y is a lower alkoxy radical and R is a lower alkyl radical.

3. A compound of the formula

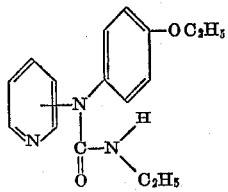

4. 3-Ethyl-1-(p-phenetyl)-1-(2-pyridyl)-urea.
5. 3-Ethyl-1-(p-phenetyl)-1-(3-pyridyl)-urea.
6. A compound of the formula

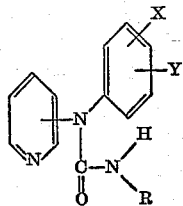

wherein X is chlorine, Y is a lower alkoxy radical, and R is a lower alkyl radical.

7. A compound of the formula

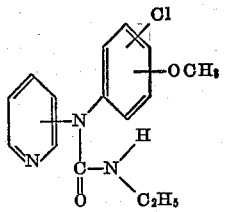

8. 1-(5-chloro-2-methoxyphenyl)-3-ethyl-1-(2-pyridyl)-urea.

9. A compound of the formula

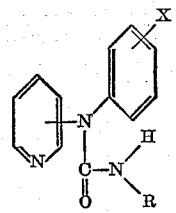

wherein X is chlorine and R is a lower alkyl radical.

10. A compound of the formula

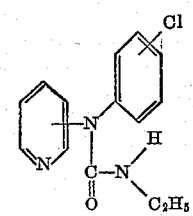

11. 1-(p-chlorophenyl)-3-ethyl-1-(2-pyridyl)-urea.
12. 1-(p-phenetyl)-1-(2-pyridyl)-urea.

References Cited in the file of this patent 974,085    France _____ Sept. 27, 1950

OTHER REFERENCES

Friedman: JACS, 69:1796 (Table I).